(12) United States Patent
Naismith

(10) Patent No.: US 7,613,783 B2
(45) Date of Patent: Nov. 3, 2009

(54) GATEWAY HAVING AN INPUT/OUTPUT SCANNER

(75) Inventor: Ronald H. Naismith, North Andover, MA (US)

(73) Assignee: Schneider Automation Inc., North Andover, MA (US)

( * ) Notice: Subject to any disclaimer, the term of this patent is extended or adjusted under 35 U.S.C. 154(b) by 710 days.

(21) Appl. No.: 10/919,829

(22) Filed: Aug. 17, 2004

(65) Prior Publication Data
US 2006/0041630 A1     Feb. 23, 2006

(51) Int. Cl.
*G06F 15/16*     (2006.01)
*G05B 19/18*     (2006.01)

(52) U.S. Cl. .......................... 709/208; 700/3
(58) Field of Classification Search ................ None
See application file for complete search history.

(56) References Cited

U.S. PATENT DOCUMENTS

| | | | | |
|---|---|---|---|---|
| 5,771,174 A * | 6/1998 | Spinner et al. | ............. | 700/129 |
| 5,862,391 A * | 1/1999 | Salas et al. | ............. | 713/300 |
| 6,151,625 A * | 11/2000 | Swales et al. | ............. | 709/218 |
| 6,151,640 A * | 11/2000 | Buda et al. | ............. | 710/11 |
| 6,209,039 B1 * | 3/2001 | Albright et al. | ............. | 709/249 |
| 6,327,511 B1 * | 12/2001 | Naismith et al. | ............. | 700/19 |
| 6,396,839 B1 * | 5/2002 | Ardalan et al. | ............. | 370/401 |
| 6,574,696 B1 * | 6/2003 | Jerman et al. | ............. | 710/305 |
| 7,246,193 B2 * | 7/2007 | Rotvold et al. | ............. | 710/311 |

OTHER PUBLICATIONS

Anonymous: "EM1500 Serial-Ethernet Bridge User's Manual—1. Introduction"; Z-World, 'Online! Mar. 22, 2004, XP002353435. Retrieved from the Internet: URL: http://web.archive.org/web/20040322105506/http:// zworld.com/documentation/docs/manuals/EM1500/introduc.htm.

Anonymous: "EM1500 Serial-Ethernet Bridge User's Manual—5. EM1500 Configuration"; Z-World, 'Online! Mar. 22, 2004, XP002354045. Retrieved from the Internet: URL: http://web.archive.org/web/20040322111529/zworld.com/documentation/docs/manuals/EM1500/config_s.htm.

Anonymous: "Protocol Converter Modbus TCP to PPI Technical Manual", ISEP, 'Online! Oct. 26, 2004, XP002354046. Retrieved from the Internet: URL: http://web.archive.org/web/20041026101054/www.ise-p.com/Instruction+Manuals/IM-Modbus+TCP+to+ppi.pdf.

* cited by examiner

*Primary Examiner*—John B. Walsh

(57) ABSTRACT

A gateway having an input/output scanner is disclosed. The gateway includes a local area network interface, a serial interface, and a processor configured to provide protocol conversion between the local area network interface and the serial interface. Further, an input/output scanner module is operatively connected to the serial interface and configured to poll the slave device.

17 Claims, 2 Drawing Sheets

GATEWAY HAVING AN INPUT/OUTPUT SCANNER

CROSS-REFERENCE TO RELATED APPLICATIONS

None.

FEDERALLY SPONSORED RESEARCH OR DEVELOPMENT

None.

TECHNICAL FIELD

The present invention generally relates to gateways for automation networks. More specifically, the present invention relates to an embedded input/output scanner within a gateway.

BACKGROUND OF THE INVENTION

A programmable logic controller (PLC) is used to monitor input signals from a variety of input points (i.e., input sensors) that report events and conditions occurring in a controlled process. For example, a PLC can monitor such input conditions as motor speed, temperature, pressure, volumetric flow and the like. A control program is stored in a memory within the PLC to instruct the PLC what actions to take upon encountering particular input signals or conditions. In response to these input signals provided by the input sensors, the PLC derives and generates output signals that are transmitted, via PLC output points, to various output devices, such as actuators and relays, to control the process. For example, as an output signal to speed up or slow down a conveyer, rotate the arm of a robot, open or close a relay, raise or lower temperature, as well as many other possible control functions.

The input and output points referred to above are typically associated with input modules and output modules, respectively. Input modules and output modules are collectively referred to as I/O modules herein. Those skilled in the art alternatively refer to such I/O modules as I/O cards or I/O boards. These I/O modules are typically pluggable into respective slots located on a backplane board provided by the PLC. The slots are coupled together by a main bus that couples any I/O module plugged into the slots to a central processing unit (CPU). The CPU itself can be located on a card that is pluggable into a dedicated slot on the backplane board of the PLC.

In the past, many control systems used a proprietary communications protocol for transmitting data between the PLC, I/O modules, and other PLCs. Today, however, many control system devices use a standard communications protocol such as Ethernet and others.

A gateway has been used to provide an interface between an Ethernet based local area network and another local area network. As such, a gateway provides the functions of a router, as well as protocol conversion between the two local area networks. Thus, a gateway allows legacy I/O modules and PLCs, that do not use Ethernet, to be operatively connected to an Ethernet based local area network.

In many control systems, PLCs are arranged in a master/slave network that includes a master PLC and a plurality of remote slave units that can be other PLCs or devices. In this type of a network, the master PLC controls its own I/O connection points and it can also control the respective I/O connection points for the remote slave unit(s). The control commands from the master PLC are derived from data obtained from the remote slave units, which is obtained from the I/O module(s) connected to each remote slave unit.

In obtaining data from the remote slave units, the master PLC polls the I/O state of the slave units to determine if they have been changed. If a change of state has occurred, then the I/O state is written to the master PLC.

Accordingly, the master PLC must scan each remote unit to determine if an I/O state change has occurred, which can be a time consuming task.

SUMMARY OF THE INVENTION

One embodiment of the present invention is directed to a system for facilitating communication between networks that use different protocols, while offloading input/output servicing from a master PLC to a gateway.

More specifically, in an embodiment, the present invention is directed to a gateway having an embedded input/output scanner. The gateway includes a local area network interface, a serial interface, and a processor configured to provide protocol conversion between the local area network interface and the serial interface. Further, an input/output scanner module is operatively connected to the serial interface and configured to poll the slave device.

A further aspect of the present invention is directed to offloading additional processing from the master PLC by the gateway being configured for event notification. As such, the gateway will receive, and provide the master or main PLC, with event notifications if an I/O state change is less than, equal to, or greater than a specified threshold.

The local area network interface within the gateway provides for connection to a host computer and/or a master PLC via, for example, a local area network that uses a communication protocol such as Ethernet, IEEE802.3, or the like. The serial interface within the gateway provides for connection to slave devices such as slave PLCs, via, for example, a serial bus that uses a communication protocol such as Modbus over RS485.

The input/output scanner module within the gateway can be part of a software program executed by the gateway's processor, or separate hardware, or a combination of both.

In an embodiment of the invention, the gateway can transmit information between an Ethernet system and a Modbus system. Such a gateway provides the ability to upgrade existing (i.e., legacy) Modbus based systems to higher performance Ethernet while maintaining the investment in the wiring, sensors etc. of the Modbus system.

In another embodiment of the invention an I/O scanner is embedded in an Ethernet to Serial Modbus gateway which is configured to poll the I/O state of each slave device connected to the gateway. The gateway is also configured to poll the slave devices at a specific poll rate. Preferably, the gateway is configured to poll specific slave devices I/O states, and if the slave I/O state has changed, to write the I/O state to a main PLC. This offloads the I/O servicing from the main PLC to the gateway, likely resulting in reduced scan time. The gateway is also capable of being configured for an event notification mechanism if a slave I/O state is either less than, equal to, or greater than a specified threshold. Again, this offloads processing from a main PLC to the gateway.

In another embodiment of the invention a gateway for communication between a local area network and a plurality of slave devices comprises a first interface for communication with the local area network, a second interface for communication with a plurality of slave devices, and an I/O scanner configured to poll an I/O state associated with each of the plurality of slave devices over the second interface. The gateway can also include a processor configured to provide a main control device connected to the local area network with a changed address of a first slave device of the plurality of slave devices over the first interface. The processor can perform this function for any of the plurality of slave devices having a changed address. Additionally, the processor can be configured to provide a main control device connected to the local area network an event notification if the I/O state associated with one of the plurality of slave devices is less than, equal to, or greater than a specified threshold. The process can also be configured to provide protocol conversion between the local area network and the plurality of slave devices.

In yet another embodiment of the invention a method of offloading processing from a main control device on a local area network to a gateway connected to a plurality of slave devices comprises the steps of: connecting a gateway having an embedded I/O scanner to the local area network through a first interface, connecting the gateway to a plurality of slave devices through a second interface, polling an I/O state associated with each of the plurality of slave devices by the I/O scanner in the gateway, and transmitting information received from the polling to the main control device over the first interface. The method can further include determining whether an address of a first slave device of the plurality of slave devices has changed from a first value to a second value, and writing the second value into a memory of the main control device. The method can further include determining if the I/O state of a first slave device of the plurality of slave devices or any of the remaining slave devices is one of less than, equal to and greater than a specified threshold, and notifying the main control device of the I/O state of the respective slave device. Additionally, the method can include converting information received from the polling from a Modbus protocol to an Ethernet protocol.

Other features and advantages of the present invention will be apparent from the following specification taken in conjunction with the following drawings.

DETAILED DESCRIPTION

Figure 1:
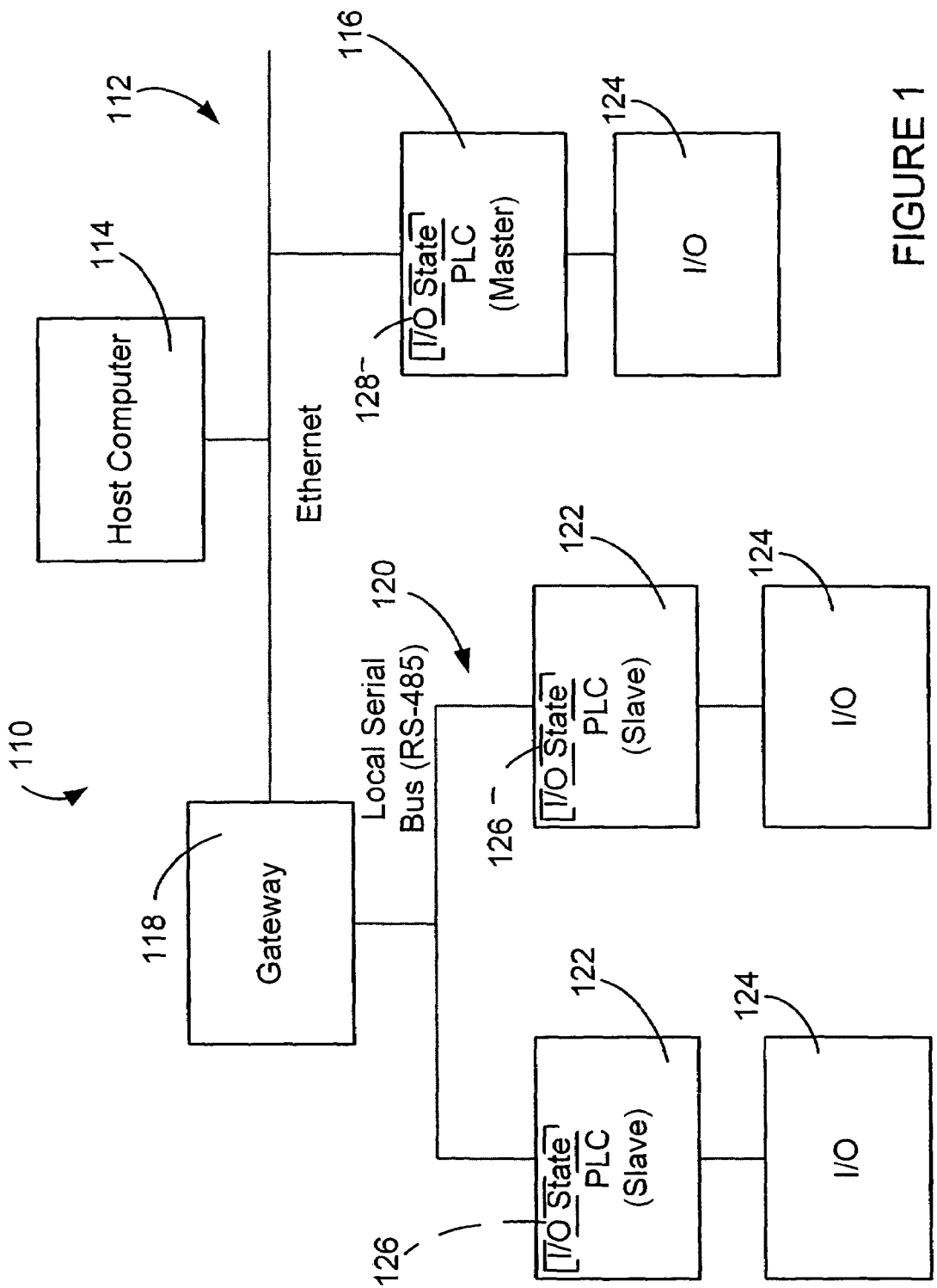
FIG. 1 is a simplified block diagram of an automation control network having a gateway in accordance with the present invention; and, FIG. 2 is a simplified block diagram depicting additional details of the gateway in FIG. 1.

While this invention is susceptible of embodiments in many different forms, there is shown in the drawings and will herein be described in detail a preferred embodiment of the present invention with the understanding that the present disclosure is to be considered as an exemplification of the principles of the invention and is not intended to limit the broad aspect of the present invention to the embodiment illustrated.

Turning to FIG. 1, a simplified block diagram of an automation control network 110 in accordance with the present invention is depicted. The control network 110 includes, but is not limited to, an Ethernet based local area network 112 having a host computer 114 and at least one master or main programmable logic controller (PLC) 116 connected thereto. Additionally, a gateway 118 is also connected to the control network 112. The gateway 118 is further connected to a local serial bus 120 with one or more slave devices, such as a slave programmable logic controller (PLC) 122, connected thereto. Each slave device, in turn, is connected to an I/O device or module 124.

Although local area network 112 is described in this embodiment as using an Ethernet communication protocol, it is to be understood that in other embodiments the network 112 can use other protocols such as, but not limited to, IEEE 802.3, CAN, CANopen, Profibus, or the like. Furthermore, the network 112 can be wired or wireless.

Turning back to FIG. 1, the host computer 114 is operably connected to the master or main programmable logic controller 116 via the Ethernet local area network (LAN) 112. In an embodiment, the host computer 114 supports the Ethernet interface and runs a protocol such as Modbus/TCP. In operation, the host computer 114 provides the master or main programmable logic controller 116 with data or programming that represents a desired operation or function to be performed by the control network 110. The data can be based, at least in part, on information (e.g., the I/O state) received by the host 114 from the input/output (I/O) devices or modules 124 within the control network 110.

The I/O device or module 124 can be, for example, an output sensor and/or actuator. The output sensor can be for a variety of variables including, but not limited to, temperature, flow, pressure, speed, and the like. Accordingly, the output of the I/O device corresponds to the variable being sensed.

The master or main PLC 116, like the host computer, is operably connected to the Ethernet local area network 112, supports the Ethernet interface, and runs Modbus/TCP. As will be appreciated by those having skill in the art, both the host computer 114 and the main PLC 116, can be conventional products that are currently available in the marketplace.

The gateway 118 is operably connected to the main PLC 116 and at least one of the slave devices 122. Although the gateway is depicted in FIG. 1 as being connected to two slave devices comprising PLCs, it is to be understood that the gateway can be connected to any number of slave devices, and not necessarily PLCs.

In an embodiment, as shown in FIG. 1, the gateway 188 can be connected between the Ethernet based local area network 112 and the local serial bus 120. The gateway 116 provides for protocol conversion between the networks. As such, the gateway 116 intercepts messages from the host computer 114 and/or the main PLC 116, on the Ethernet network 112, and converts and distributes these messages to at least one of the slave devices 122 on the local serial bus 120. Similarly, information originated by the slave devices 122 is received by the gateway 116 via the local serial bus 120, and converted and transmitted on the Ethernet network 114 to either the host computer 114 or the main PLC 116. In an embodiment, the gateway 118 supports Modbus/TCP over Ethernet and the serial interface provided by the gateway is software configurable to support RS-232, RS-422/485, or the like.

Figure 2:
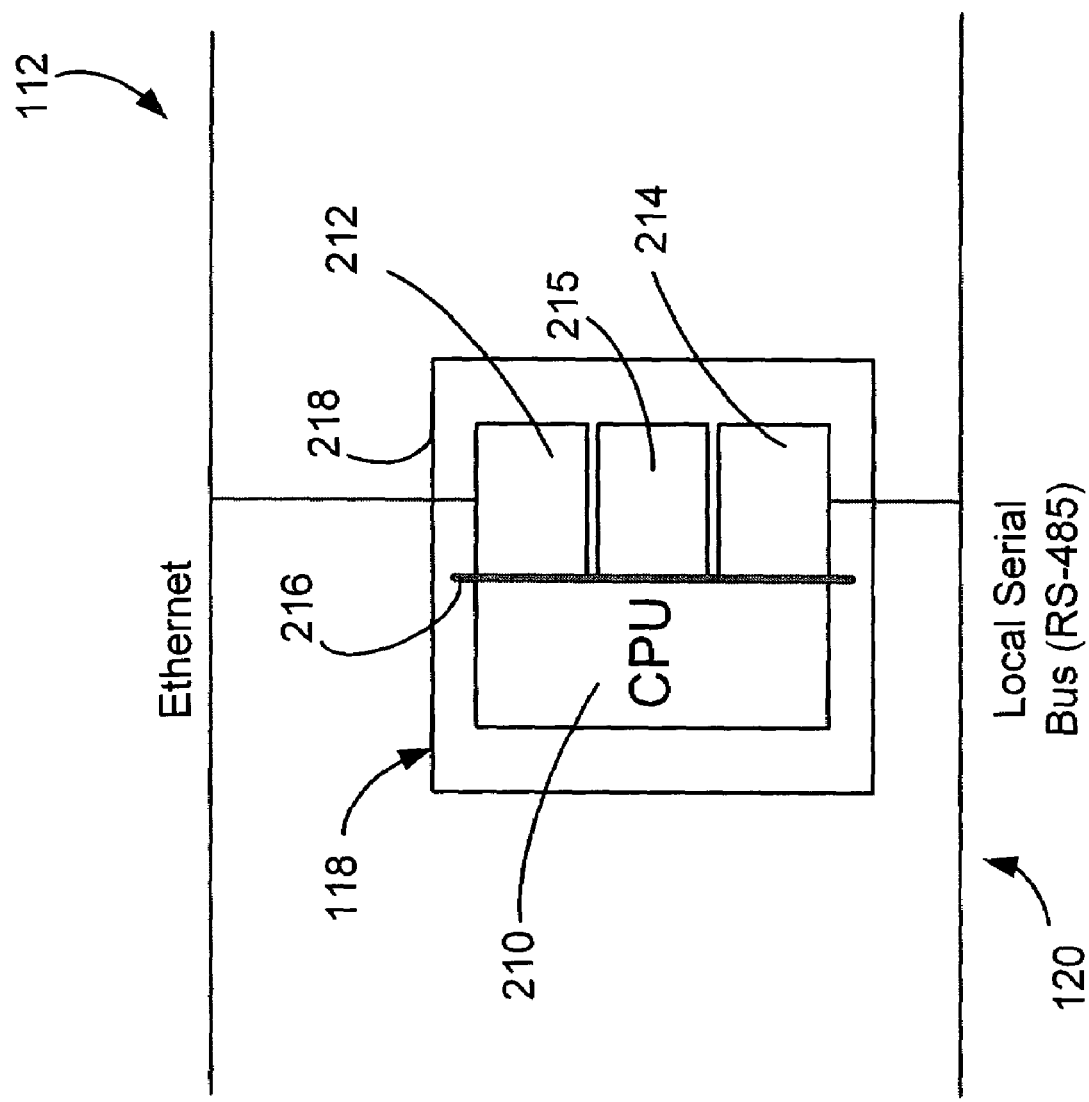

Turning to FIG. 2, a simplified block diagram is provided of the gateway 118. In an embodiment, the gateway includes, but is not necessarily limited to, a processor or CPU 210, a local area network interface 212 comprising an Ethernet interface card 212, a serial interface 214 comprising a local operating network card 214, and a backplane 216 within a conventional housing 218 suitable for placing the gateway within an industrial environment.

The Ethernet interface card 212 provides the interface to the Ethernet LAN 112 depicted in FIGS. 1 and 2. Likewise, the local operating network card 214 provides the interface to the devices on the local serial bus 120.

The processor or CPU 210 is a conventional device that provides for executing a real-time multitasking operating system. Moreover, the hardware and software executed by the CPU 210 includes a database to store network node addresses and message indexes, protocol tasks to interface between the buses, and tasks to control the overall data transfer.

In an embodiment, the gateway 118 also preferably includes an I/O scanner function that can be performed by the CPU 210, or additional hardware/software on the CPU circuit card, or an optional module 215 attached to the backplane 216. As such, the I/O scanner provides for the gateway to poll the I/O state each slave device 112 (e.g., slave PLC 122 or the like) attached to the local serial bus 120.

Turning back to FIG. 1, the I/O scanner is preferably configured, by a user via the host computer 114 or the like, regarding the I/O state 126 of each slave device 122 on the local serial bus 120 that must be polled, along with the desired poll rate. The user can perform the configuration by means of a display (not shown) provided on a graphical user interface associated with the host computer 114

In operation, the gateway 118 polls the specified I/O state 126 of each slave device and, if the I/O state has changed, the new I/O state is written to the main PLC 116 via the gateway.

In a further embodiment, the gateway 118, and in particular the processor CPU 210, can be configured for an event notification if an I/O state 26 of a slave device 122 is detected, after being scanned by the gateway, as either being less than, equal to, or greater than a specified threshold. The gateway event notifications can be configured via a graphical user interface (not shown) provided by the host computer 114 or the like. The notification of the event can be provided to the host computer 114, the main PLC 116, or another device within the control network 110.

While the specific embodiments have been illustrated and described, numerous modifications come to mind without significantly departing from the spirit of the invention, and the scope of protection is only limited by the scope of the accompanying Claims.

What is claimed is:

1. A gateway for communication between a main control device connected to a local area network and a plurality of slave devices connected to a local serial bus in an industrial automation control network, the gateway comprising:
    a first interface for communication with the main control device over the local area network;
    a second interface for communication with a plurality of slave devices over the local serial bus; and,
    an I/O scanner processor configured to poll an I/O state of each of the plurality of slave devices over the second interface, to process the I/O state information received from polling each slave device and determine whether to transmit information to the main control device based on the I/O state information, and to occasionally transmit such information to the main control device over the first interface based on such determination, thereby offloading the slave device I/O scan processing from the main control device to the gateway.

2. The gateway of claim 1, wherein the I/O scanner processor is configured to transmit to the main control device over the first interface the I/O state of a first slave device of the plurality of slave devices upon the change of I/O state of such slave device.

3. The gateway of claim 2, wherein the main control device is a master programmable logic controller.

4. The gateway of claim 1, wherein the I/O scanner processor is configured to provide the main control device an event notification if the I/O state of one of the plurality of slave devices is less than, equal to, or greater than a specified threshold.

5. The gateway of claim 1, wherein the gateway provides protocol conversion between the local area network and the local serial bus for the plurality of slave devices.

6. The gateway of claim 1, wherein at least one of the plurality of slave devices is a programmable logic controller.

7. The gateway of claim 6, wherein the programmable logic controller is connected to an I/O device.

8. The gateway of claim 1, wherein the plurality of slave devices utilize a Modbus protocol.

9. The gateway of claim 1, wherein the local area network utilizes the Ethernet protocol.

10. The gateway of claim 1, wherein the main control device is a host computer.

11. An industrial automation control system comprising:
    a master PLC connected to a local area network;
    a plurality of slave PLCs connected to a local serial bus, the plurality of slave PLCs each having an I/O device; and
    a gateway connected to the local area network and the local serial bus, the gateway configured to provide protocol conversion between the local area network interface and the local serial bus, the gateway further comprising an I/O scanner configured to poll an I/O state of the plurality of slave PLC I/O devices, to process the I/O state information received from polling each slave I/O device and determine whether to notify the master PLC based on the I/O state information, and to occasionally notify the master PLC based on such determination, thereby offloading the slave PLC I/O scan processing from the master PLC to the gateway and reducing the I/O scan time.

12. The control system of claim 11, wherein the gateway is configured to notify the master PLC upon the change of I/O state of any slave PLC I/O device.

13. The control system of claim 11, wherein the gateway is configured to notify the master PLC if the I/O state of one of the plurality of slave devices is less than, equal to, or greater than a specified threshold.

14. The control system of claims 13, wherein the gateway is configured to transmit information received from polling a slave I/O device with a notification to the master PLC.

15. The control system of claim 13, further comprising a host computer operably connected to the local area network, and wherein the polling rate of the I/O scanner processor is configurable by the host computer.

16. The control system of claim 13, wherein the master PLC supports Modbus/TCP over Ethernet.

17. The control system of claim 13, wherein the plurality of slave PLCs utilize a Modbus protocol.

* * * * *

UNITED STATES PATENT AND TRADEMARK OFFICE
CERTIFICATE OF CORRECTION

PATENT NO. : 7,613,783 B2 Page 1 of 1
APPLICATION NO. : 10/919829
DATED : November 3, 2009
INVENTOR(S) : Ronald H. Naismith It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1089 days.

Signed and Sealed this

Nineteenth Day of October, 2010

David J. Kappos
*Director of the United States Patent and Trademark Office*